2 Sheets—Sheet 1.

W. CORNWELL.
Dress-Chart.

No. 209,111. Patented Oct. 22, 1878.

Witnesses
G. E. Hoffman
N. Cowles

Inventor
Willett Cornwell
By Gridley & Sherburne
Attys.

W. CORNWELL.
Dress-Chart.

No. 209,111.  Patented Oct. 22, 1878.

UNITED STATES PATENT OFFICE.

WILLETT CORNWELL, OF PHILADELPHIA, PENNSYLVANIA.

IMPROVEMENT IN DRESS-CHARTS.

Specification forming part of Letters Patent No. 209,111, dated October 22, 1878; application filed March 21, 1878.

*To all whom it may concern:*

Be it known that I, WILLETT CORNWELL, of Philadelphia, in the county of Philadelphia and State of Pennsylvania, have invented certain new and useful Improvements in Charts for Applying Measurements and Laying Out Dress-Waists; and I do hereby declare the following to be a full, clear, and exact description thereof, which will enable others skilled in the art to which my invention appertains to make and use the same, reference being had to the accompanying drawings, forming part of this specification, in which—

Figure 1:
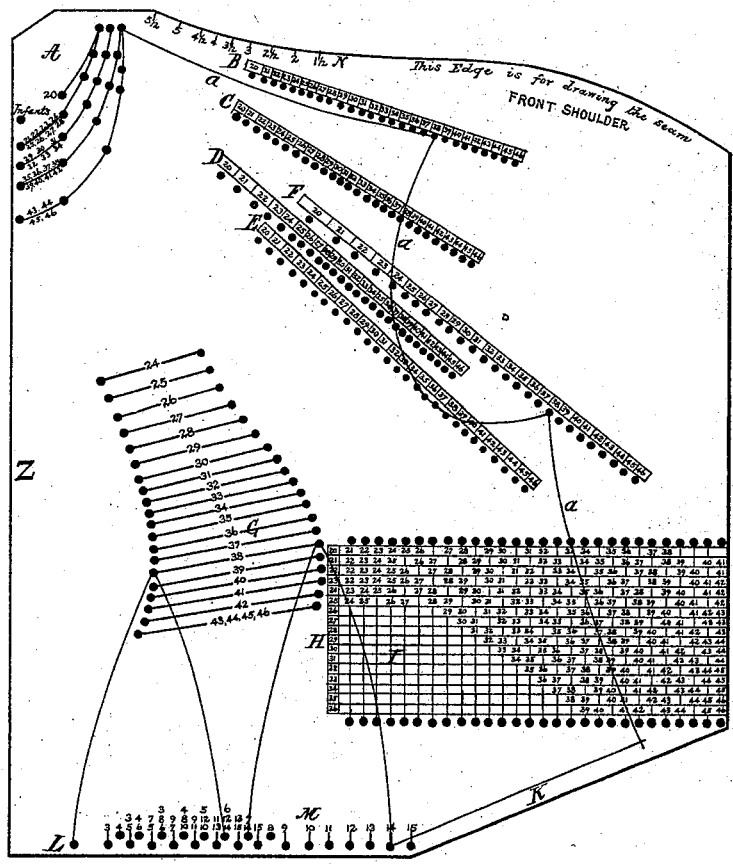
Figure 2:
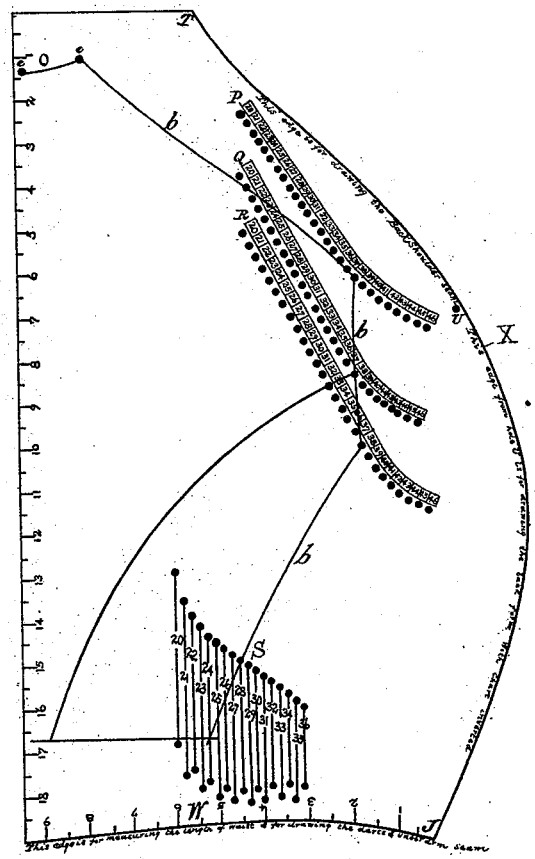

Figure 1 represents the chart employed to determine the size and shape of the front portion of the waist, and Fig. 2 represents the chart employed for determining the size and shape of the back portion of the waist.

The object of my invention is to improve the chart for applying measurements and laying out dress-waists patented to myself and Elmira Cornwell, March 15, 1870; and to that end my invention consists in the arrangement of the several scales employed in giving shape to the different portions of the waist, as hereinafter described and claimed.

I construct my charts of thick card or pasteboard, with the scales of figures, letters, and dots plainly printed thereon, as shown in the respective figures of the drawing, and the charts are each perforated through the several scales at the point indicated by the dots, so as to admit of marking the fabric through the perforations and at the point indicated by the figures in the scale, by which means the required form is given to the separate parts of the waist, as shown by the lines *a* and *b*.

In the drawing, A represents the scale indicating the neck-size of the front portion of the waist. B, C, D, E, and F represent the scales which indicate the size and form of the shoulder and arm size. H and I represent the scales for indicating the size of the lower portion of the waist. G represents the scale for locating the upper point of the darts. M represents the scale employed to determine the location and width of the lower portion of the darts, and N represents the scale for giving the requisite form to the shoulder, all of which are arranged with relation to each other, as shown in Fig. 1.

In Fig. 2, *e e* on line O represent the dots which indicate the neck-size of the back portion of the waist. P, Q, and R represent the scales which indicate the size and form of the shoulder and arm-size, and S represents the scale employed to determine the size of the lower portion of the waist, all of which are arranged relative to each other, as shown in Fig. 2.

W, Fig. 2, represents the curved edge of the back-chart which is employed to determine the length of the waist and to describe the form of the darts. X represents the curved edge of the back-chart which is employed to describe the form of the upper and lower portions of the back of the waist, which are manipulated during the process of laying out the dress-waist, as hereinafter described.

The manner of using my improved chart is as follows: First, take the bust-measure close under the arms, around the largest part of the bust; second, the waist-measure, close around the body at the bottom edge of the proposed dress-waist; third, the length of the waist under the arm down to the lower edge of the waist; fourth, the shoulder-measure, from the top of the neck-band along the top of the shoulder to the hollow or bend of the collar-bone; fifth, subtract the waist-measure from the bust-measure, and the difference will be the taper-measure of the waist.

To lay out the front of the waist:

First. Fold the fabric from which the waist is to be cut longitudinally at the center, and place the chart, Fig. 1, thereon, with the straight edge Z parallel with the selvage edge of the fabric, and a sufficient distance therefrom to allow for the fold or part turned under. Then mark the fabric through the several holes in scale A upon the curved line on which is found the figures corresponding with the bust-measure.

Second. Mark through the holes in scales B, C, D, E, and F at the figures corresponding with the bust-measure, and through the holes at the right and left hand of the figures corresponding with the bust-measure in scale G.

Third. Find the figures in scale H which correspond with the waist-measure. Then follow the heavy line to the right hand in scale I until you find the figures corresponding with the bust-measure. Then mark the fabric through the holes in the same column above and below the figures last named; remove the chart from the fabric, and draw a curved line through the several dots or marks made in scale A, which will give the size and form of the neck.

Fourth. Draw a curved line through the dots or marks made through scales B, C, D, E, and F, which will give the form and size of arm-hole.

Fifth. Take the front chart and place the edge thereof at the figure corresponding with the shoulder-measure in scale N upon the upper dot or mark made through scale A. Move the chart until its edge intersects the dot or mark made through scale B. Then draw a line along the edge of the chart from dot in scale A to dot in scale B, which gives the form of the shoulder.

Sixth. Draw a straight line from dot to dot, made through scale I. Then take the edge of the back-chart marked W and place the point J upon the dot or mark made through scale F, and move the chart until the figure upon the edge W, which corresponds with the length of the waist, intersects the line made from dot to dot in scale I. Then draw a line along the edge W, which will give the length and form of the lower portion of the waist.

Seventh. Place the front chart upon the fabric, as before, and move the same up or down, keeping the left-hand edge parallel with the edge of the fabric until the bottom or sloping edge K comes to the end of the last line drawn at its intersection with the line drawn from dot to dot made through scale I. Then draw a line along the entire bottom edge of the chart.

Eighth. Mark the fabric through hole L in scale M; also, through the three holes in scale M, at the bottom of the three respective columns of figures in which are found the figures corresponding with the taper-measure, as ascertained by subtracting the waist-measure from the bust-measure.

Ninth. Remove the chart, and place point J on edge W of the back-chart on the dot made through scale G at the left hand of the column of figures, allowing the edge W to intersect the dot made through hole L in scale M. Then draw a line along the edge W from point J to the dot. Then turn the back-chart reverse side up, allowing point J to remain upon the dot in scale G. Move the chart to the right, so that the edge W will intersect the first dot made through scale M to the right hand of hole L. Draw a line from point J along edge W to dot. Then move the chart to the right until point J is upon the dot made through scale G at the right hand of the column of figures, allowing edge W to intersect the right-hand dot in scale M. Draw a line from point J along edge W to the dot. Then turn the chart right side up, allowing point J to remain on the dot made through scale G, moving the chart to the left until edge W intersects the second dot to the right of hole L. Draw a line from point J along edge W to the dot, as before, which completes the form of the front portion of the waist.

To lay out the back portion of the waist:

First. Place the back-chart, Fig. 2, upon the fabric, when folded, with the long straight edge of the chart at the selvage edge of the cloth, and mark the cloth through the holes e e on line O.

Second. Mark the fabric through the holes in scales P, Q, and R at the figures corresponding with the bust-measure, and through the holes above and below the figures corresponding with the waist-measure in scale S.

Third. Remove the chart from the fabric, and draw a straight line from dot to dot made through scale S.

Fourth. Draw a curved line from dot to dot made through holes e e on line O.

Fifth. Draw a curved line from the dot made through scale P, through the dot in scale Q, to the dot made through scale R.

Sixth. Place point T of the edge X of the back-chart on the dot made through the right-hand hole e, allowing the edge X to intersect the dot made through scale P. Then draw a line on the fabric along the edge X from point T to the dot in scale P.

Seventh. Place point J of the edge W on the dot made through scale R, allowing the edge W, at the figure indicating the length of the waist, to intersect the line drawn from dot to dot made through scale S. Then draw a line along the edge W from point J to the line in scale S.

Eighth. Remove the chart and draw a straight line from the point of intersection of the lines in scale S to the edge of the fabric at right angles with said edge, which gives the bottom of the waist.

Ninth. Turn the back-chart reverse side up, and place the edge X at the hole U on the dot made through scale Q, allowing the edge X to cross the line indicating the bottom of the waist at a point about one-half inch from the left-hand edge of the fabric. Then draw a line along the edge X from the dot to the line indicating bottom of the waist, which completes the form of the back portion of the waist.

In cutting the separate parts of the waist the lines marked upon the fabric, as heretofore described, are followed in the usual manner.

It will be observed, by reference to Fig. 2 of the drawings, that the lower end of the scales P, Q, and R are curved upward from a straight line, so as to change their position relative to each other, the object of which is to increase the arm-size, and increase the size of the waist around the bust without changing the form of the shoulder or materially shortening the length of the waist when used for persons of large size, and thereby make a more perfect fit to the waist than would be the case if the plane of the scales were straight.

It will also be observed, by reference to Fig. 1, that the upper portion of scale G is less in width than the lower portion, and that a central line drawn through the dots on each side of the scale would describe a curve, and would incline toward the front edge of the chart at the upper end of the scale, the object of which is to change the location of the points of the darts when used for persons of different sizes, and thereby make a more perfect fit to the waist, and especially when used for cutting garments for children.

Having thus described my invention, what I claim as new, and desire to secure by Letters Patent, is—

1. The combination, in a chart for laying out dress-waists with the perforated scales A, B, C, D, E, F, H, I, and M, as described, of the scale G, having the two lines of perforations arranged to describe a curve, and so as to incline toward each other at the upper end of the scale and toward the front edge of the chart at the top and bottom, substantially as and for the purpose specified.

2. The combination, with the perforated scale S and perforations e e, as described, of the perforated scales P, Q, and R, curved at their lower ends, substantially as and for the purpose specified.

WILLETT CORNWELL.

Witnesses:
   G. R. HOFFMAN,
   W. K. SHRYOCK.